United States Patent [19]

Pierini et al.

[11] Patent Number: 5,196,259
[45] Date of Patent: Mar. 23, 1993

[54] MATRIX COMPOSITES IN WHICH THE MATRIX CONTAINS POLYBENZOXAZOLE OR POLYBENZOTHIAZOLE

[75] Inventors: Peter E. Pierini; Ritchie A. Wessling, both of Berkeley; Peter K. Kim, Danville, all of Calif.

[73] Assignee: The Dow Chemical Company, Midland, Mich.

[21] Appl. No.: 624,164

[22] Filed: Dec. 7, 1990

[51] Int. Cl.$^5$ .............. B32B 27/02; C08G 18/60
[52] U.S. Cl. ..................... 428/245; 428/224; 428/286; 428/288; 428/289; 428/408; 528/73; 528/172; 528/361; 524/417; 524/706; 524/176; 524/183
[58] Field of Search ............ 428/288, 408; 528/408, 528/73, 172, 361

[56] References Cited

U.S. PATENT DOCUMENTS

| | | | |
|---|---|---|---|
| 4,487,735 | 12/1984 | Chenevey et al. | 264/184 |
| 4,533,692 | 8/1985 | Wolfe et al. | 524/417 |
| 4,533,693 | 8/1985 | Wolfe | 524/417 |
| 4,533,724 | 8/1985 | Wolfe et al. | 528/313 |
| 4,703,103 | 10/1987 | Wolfe et al. | 528/179 |
| 4,722,678 | 9/1988 | Sybert et al. | 425/145 |
| 4,871,595 | 10/1989 | Susignea | 428/1 |
| 4,898,924 | 2/1990 | Chenevey et al. | 528/183 |
| 4,996,281 | 2/1991 | So | 528/73 |
| 4,996,806 | 10/1991 | Lusignea et al. | 52/157 |
| 4,999,395 | 3/1991 | Croman et al. | 524/607 |

FOREIGN PATENT DOCUMENTS 8912072 12/1989 PCT Int'l Appl. .
8912548 12/1989 PCT Int'l Appl. .

OTHER PUBLICATIONS

11 Ency.Poly.Sci. & Eng., *Polybenzothiazoles and Polybenzoxazoles*, 601 (J. Wiley & Sons 1988).
Lusignea, "Film Processing and Applications for Rigid Rod Polymers," *The Materials Science and Engineering of Rigid-Rod Polymers*, 265–276 (Materials Research Society 1989).
Sandor, *Polybenzimidazole (PBI) as a Matrix Resin Precursor for Carbon/Carbon Composites*, 22nd Annual SAMPE Technical Conference (1990).

*Primary Examiner*—Patrick J. Ryan
*Assistant Examiner*—Richard C. Weisberger

[57] ABSTRACT

Fibers may be prepregged with a dope containing polybenzoxazole or polybenzothiazole. The prepreg may be contacted with water or another nonsolvent to coagulate the polymer and form a matrix composite.

19 Claims, No Drawings

5,196,259

MATRIX COMPOSITES IN WHICH THE MATRIX CONTAINS POLYBENZOXAZOLE OR POLYBENZOTHIAZOLE

BACKGROUND OF THE INVENTION

This invention relates to matrix composites and processes for making them.

A fiber-reinforced composite, or matrix composite, is an article comprising a plurality of fibers (the reinforcement) embedded in a plastic (the matrix). Typically, the fibers give strength and/or stiffness to the composite, and the matrix maintains fiber alignment and transfers load around broken fibers. Matrix composites are described in detail in numerous references, such as Kirk-Othmer Ency. Chem., Tech.-Supp., *Composites, High Performance*, at 260–281 (J. Wiley & Sons 1984)

A number of fibers are available for use in matrix composites, each having different combinations of tensile and compressive strength and modulus, temperature stability, creep, cost, and other properties. Suitable fibers may contain, for example, aramid (such as Kevlar TM fibers), boron, glass, carbon, gel-spun polyethylenes (such as Spectra TM fiber), polybenzoxazole, polybenzothiazole, or polybenzimidazole. Suitable fibers and processes for their fabrication are described in numerous references, such as U.S. Pat. No. 4,533,693; 3 Kirk-Othmer Ency. Chem. Tech., *Aramid Fibers*, 213 (J. Wiley & Sons 1978); Kirk-Othmer Ency. Chem., Tech.-Supp., *Composites, High Performance*, at 261–263; 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers*, at 245–312 (Materials Research Society 1989).

A number of matrix materials are also available for use in matrix composites. Examples of polymer matrix materials include polyesters, epoxy resins, polycyanates, polybutadienes, vinyl ester resins and polyimides. Some carbon matrix composites have been made. Metal and ceramic matrix composites are also known.

There is a need for improved matrix materials in advanced matrix composites. For example, the nonflammability, chemical resistance, solvent resistance and thermal stability of many polymer matrix materials is much poorer than the same properties of the fiber reinforcement. Stronger polymer matrices could yield stronger composites using the same amount of fiber. Metal matrix materials are heavier than polymers. Ceramic and carbon matrix materials are expensive and brittle. An objective of the present invention is to provide a fiber-reinforced composite having new polymer matrix materials.

SUMMARY OF THE INVENTION

One aspect of the present invention is a fiber-reinforced composite comprising:

(1) a number of fibers sufficient to provide reinforcement for the composite; and
(2) a matrix, that contains a polybenzoxazole polymer or copolymer and/or a polybenzothiazole polymer or copolymer, in a quantity sufficient to bind the fibers together and maintain the alignment of the fibers.

A second aspect of the present invention is a process for synthesizing a fiber-reinforced composite, said process comprising the steps of:

(1) prepregging a plurality of fibers with a solution that contains: (i) a polybenzoxazole polymer or copolymer and/or a polybenzothiazole polymer or copolymer, and (ii) a solvent for the polymer or copolymer; and
(2) contacting the solution with a liquid that causes the polymer or copolymer to coagulate, in a quantity sufficient to cause the polymer or copolymer to coagulate with the fibers embedded therein.

A third aspect of the present invention is a shaped article containing a fiber reinforced composite of the present invention.

The process of the present invention can be used to synthesize composites of the present invention. The polybenzoxazole or polybenzothiazole matrix in the composite can be selected to provide low flammability, low smoke generation, high temperature stability, high chemical resistance, high solvent resistance, high strength and/or modulus or a combination of those properties. Composites of the present invention and shaped articles containing them are useful for structural materials and parts.

DETAILED DESCRIPTION OF THE INVENTION

The present invention uses fibers, such as those previously described. The fibers should be a type whose properties are not substantially degraded by contact with the solution of polymer or copolymer and its solvent. The fiber is preferably aramid, carbon, polybenzoxazole or polybenzothiazole. It is most preferably carbon or polybenzoxazole. Polybenzoxazole and polybenzothiazole fibers are preferably heat treated. The tensile strength of the fiber is preferably at least about 2.5 GPa, more preferably at least about 3.0 GPa and most preferably at least about 3.5 GPa. The tensile modulus of the fiber is preferably at least about 135 GPa, more preferably at least about 200 GPa and most preferably at least about 270 GPa.

The fibers may have dimensions that are usual for reinforcing materials in matrix composites. Their average diameter is preferably no more than about $40\mu$ and more preferably no more than about $20\mu$. The fiber may be, for instance, in the form of a cloth or in the form of long strands or in the form of a short fiber or fiber pulp suitable for making random fiber composites. A mixture of fibers may be used. For instance, the fibers may contain a mixture of at least one fiber having high tensile properties, such as aramid or polybenzazole, and another fiber having high compressive properties, such as quartz.

The present invention also uses matrix materials containing polybenzoxazole (PBO) or polybenzothiazole (PBT) or copolymers thereof. PBO, PBT and random, sequential and block copolymers of PBO and PBT are described in references such as Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 Aug. 6, 1985); Wolfe, *Liquid Crystalline Polymer Compositions, Process and Products*, U.S. Pat. No. 4,533,693 (Aug. 6, 1985); Evers, *Thermoxadatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S.

Pat. No. 4,578,432 (Mar. 25, 1986); 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers* (Materials Research Society 1989), which are incorporated herein by reference.

The polymer may contain AB-mer units, as represented in Formula 1(a), and/or AA/BB-mer units, as represented in Formula 1(b)

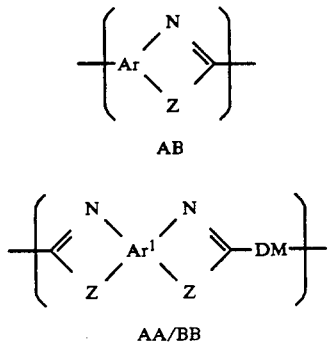

wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra, at 602, which is incorporated herein by reference.

The polymer preferably consists essentially of either AB-PBZ mer units or AA/BB-PBZ mer units, and more preferably consists essentially of AA/BB-PBZ mer units. The polybenzazole polymer may be rigid rod, semi-rigid rod or flexible coil. It is preferably rigid rod in the case of an AA/BB-PBZ polymer or semi-rigid in the case of an AB-PBZ polymer. Azole rings within the polymer are preferably oxazole rings (Z=O). Preferred mer units are illustrated in Formulae 2(a)–(g). The polymer more preferably consists essentially of mer units selected from those illustrated in 2(a)–(g), and most preferably consists essentially of a number of identical units selected from those illustrated in 2(a)–(c).

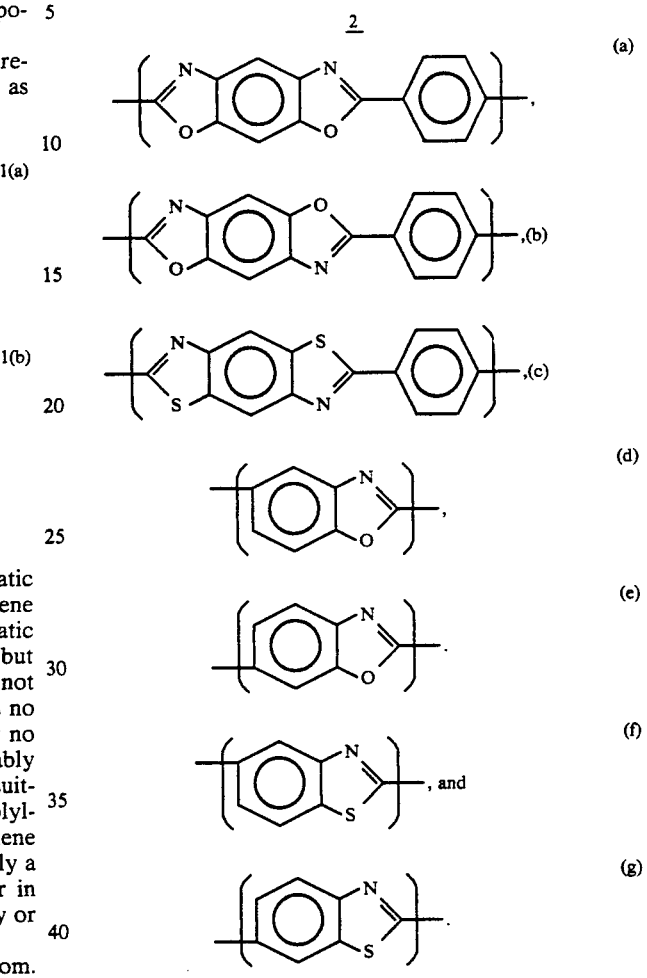

Each polymer preferably contains on average at least about 25 mer units, more preferably at least about 50 mer units and most preferably at least about 100 mer units. The intrinsic viscosity of rigid AA/BB-PBZ polymers in methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 40 dL/g. The intrinsic viscosity of semi-rigid AB-PBZ polymers is preferably at least about 5 dL/g, more preferably at least about 10 dL/g and most preferably at least about 15 dL/g.

The polymer or copolymer preferably is not thermoplastic—i.e., it does not become flowable or moldable at any temperature below its decomposition temperature. The polymer or copolymer is preferably essentially insoluble in common organic solvents such as halogenated hydrocarbons, alkanes, benzene or toluene. The polymer or copolymer is preferably insoluble in nonacidic aqueous solvents.

The polymer or copolymer is dissolved in a solvent to form a solution or dope. Some polybenzoxazole and polybenzothiazole polymers are soluble in cresol, but the solvent is preferably an acid capable of dissolving the polymer. The acid is preferably non-oxidizing. Examples of suitable acids include polyphosphoric acid, methanesulfonic acid and sulfuric acid and mixtures of those acids. The acid is preferably polyphosphoric acid and/or methanesulfonic acid, and is more preferably polyphosphoric acid. The fiber should be chosen so that its properties do not degrade upon contact with the acid.

The dope should contain a high enough concentration of polymer for the polymer to coagulate to form a solid article. When the polymer is rigid or semi-rigid, then the concentration of polymer in the dope is preferably high enough to provide a liquid crystalline dope. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 Aug. 6, 1985); Sybert et al., U.S. Pat. No. 4,772,678 (Sep. 20, 1988); Harris, U.S. Pat. No. 4,847,350 (Jul. 11, 1989); and Ledbetter et al., "An Integrated Laboratory Process for Preparing Rigid Rod Fibers from the Monomers," *The Materials Science and Engineering of Rigid-Rod Polymers* at 253–64 (Materials Res. Soc. 1989), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

The fiber is prepregged with the dope. The optimum procedure for prepregging the fiber in the dope will vary depending upon the fiber, the dope and the desired composite. A less viscous dope, whose viscosity is similar to that of other uncured matrix resins, may be prepregged according to processes used for known matrix resins. Likewise, a fiber or fiber tow or a group of tows may be prepregged with a viscous dope by known means for putting viscous coatings on fibers or wires, such as by extruding the dope on the fiber using a crosshead die.

Such processes ordinarily form a prepregged tape that can be laid up in a desired orientation and shape. Many different fiber configurations are known and may be used. The fibers may run in a single direction to form a unidirectional composite, having great strength in one direction but poorer properties in other directions. The fibers may be laid out in layers directed at different angles with respect to each other to form a multidirectional composite. The prepreg may be laid out flat or filament wound to form a shaped article.

A group of fibers or tows may be prepregged with a dope that is viscous enough to form a film, by forming one or more dope films and either pressing the fibers into a single film of dope or pressing the fibers between two films of dope. Several alternating layers of fiber and dope film may be pressed together to form a composite having several layers of fiber. The fibers pressed into the dope may have unidirectional or multidirectional orientation as previously described. They may be part of a cloth or a non-woven mat. The dope film may be thicker to form a "resin-rich" composite or thinner to form a "resin-starved" composite. The dope film is preferably on average at least about 25 $\mu$m thick. The temperature should be high enough for the fibers to embed in the dope and for the dope sheets to consolidate.

The film may be uniaxially stretched to provide best properties in a single direction, but it is preferably biaxially stretched to provide good properties in at least two directions. The extrusion of dopes to form films is described in numerous references, such as in Chenevey, U.S. Pat. No. 4,487,735 (Dec. 11, 1984); Lusignea et al., U.S. Pat. No. 4,871,595 (Oct. 3, 1989); Chenevey, U.S. Pat. No. 4,898,924 (Feb. 6, 1990); Harvey et al., U.S. Pat. No. 4,939,235 (Jul. 3, 1990); Harvey et al., U.S. Pat. No. 4,963,428 (Oct. 16, 1990); and Lusignea et al., U.S. Pat. No. 4,966,806 (Oct. 30, 1990), which are incorporated herein by reference. For instance, the dope may be extruded from a slit die, after which it is preferably mechanically stretched before coagulation to impart biaxial orientation. Alternatively, the dope may be extruded in a tubular film that is preferably stretched biaxially by a bubble process to impart biaxial orientation.

The fibers may be short fibers or fiber pulps that are immersed in the dope to form a random fiber composite, similar to those described in U.S. Pat. Nos. 4,426,470 and 4,550,131, which are incorporated herein by reference.

After prepregging is accomplished and the prepregs are laid up in the desired shape and configuration, the composite is hardened by contacting the dope with a liquid that causes the polymer or copolymer to coagulate. Ordinarily, the liquid is a nonsolvent for the polymer or copolymer that dilutes the solvent. Many nonsolvent liquids have been studied and their effects on polybenzazole coagulation reported. The nonsolvent liquid is preferably volatile. The nonsolvent liquid may be an organic compound, such as an alcohol or a ketone containing no more than about 4 carbon atoms. The nonsolvent liquid is preferably aqueous, and more preferably consists essentially of water, at least at the commencement of the coagulation. When the solvent is volatile or contains a volatile component, such as methanesulfonic acid, then the volatile component can be at least partially removed by evaporation to concentrate the polymer before coagulation.

The coagulated polymer is preferably washed for a period of time sufficient to remove substantially all of the remaining solvent. The composite may be dried. It is preferably restrained from shrinking as it is dried. After drying, the composite may be heat treated. Heat treatment is preferably carried out under pressure. The finished composite may be machined into a desired final shape.

The resulting composite has fibers as previously described embedded in a matrix resin containing a polybenzoxazole or polybenzothiazole polymer or copolymer as previously described. The composite should contain a sufficient number of fibers to provide reinforcement for the composite. It should contain a sufficient quantity of matrix material to hold the fibers together and maintain fiber alignment, and preferably to transfer loads around broken fibers.

The composite preferably contains at least about 20 volume percent fiber, more preferably at least about 40 volume percent fiber and most preferably at least about 50 volume percent fiber. It preferably contains at least about 20 volume percent matrix and more preferably at least about 35 volume percent matrix.

Several variations on the basic composite are possible. For instance, the fiber may receive surface treatment or be coated with an adhesive to improve the adhesion of the fiber to the matrix. The matrix may contain a mixture of more than one polymer, such as several polybenzazole polymers or a mixture of the polybenzazole fiber and a non-polybenzazole polymer, as described in Uy, U.S. Pat. No. 4,810,735 (Mar. 7, 1989), which is incorporated herein by reference. The matrix preferably contains only a single polymer or copolymer. The fiber may be wrapped with another fiber to improve compressive strength, as described in U.S. Pat. No. 4,499,716 and in Ledbetter, Ser. No. 564,480 (filed Aug. 8, 1990), which are incorporated herein by reference.

The preferred polybenzoxazole and polybenzothiazole matrix resins are essentially nonflammable and do not release smoke. They have good solvent resistance, good chemical resistance and high continuous use temperatures. They have a high strength per unit weight or volume. The composite may be fabricated into structural parts for many known uses.

ILLUSTRATIVE EXAMPLES

The following examples are given to illustrate the invention and should not be interpreted as limiting the Specification or the Claims. Unless stated otherwise, all parts and percentages are given by weight.

EXAMPLE 1

Composite Containing Carbon Fiber and Polybenzoxazole Matrix.

A dope containing 14 weight percent cis-poly-benzoxazole (consisting essentially of mer units illustrated in Formula 2(a)—intrinsic viscosity of about 25 dL/g to 45 dL/g in methanesulfonic acid at about 25° C.) in polyphosphoric acid is extruded from a slit die as a 15 mil thick sheet between two sheets of 2 mil thick Teflon TM fluoropolymer. Two 3 inch by 3 inch squares of the dope film are cut, and the Teflon TM sheet is stripped off of one side of each sheet.

A 3 inch by 3 inch piece of Panex TM PWB-6 carbon fiber cloth, available from Stackpole Fibers Inc., is placed between the two dope film samples, with the dope sides against the carbon fiber cloth. The article is pressed at 150° C. under 5 tons of pressure for one minute to form a prepreg.

The prepreg is cooled to room temperature, and the Teflon TM sheet is stripped off of each side of the prepreg. The prepreg is placed in a "picture frame" holder to prevent shrinkage along the length and width of the sample but allow shrinkage in the thickness of the sample. The framed prepreg is placed in two liters of water, left in the water for two days, removed from the frame and dried in air at ambient temperature. A composite having carbon fiber reinforcement and a cispolybenzoxazole matrix results.

The composite is cut in half. One half is placed in a heated press at 150° C. and 5000 lbs pressure for one minute. It is golden yellow in color. One half is placed in a heated press at 300° C. and 5000 lbs pressure for one hour. It is darker yellow with a purple tinge. Both have smooth surfaces with no visible holes. The polybenzoxazole in both adheres firmly to the cloth.

EXAMPLE 2

Composite Containing Carbon Fiber and Nonrigid Matrix.

The procedure of Example 1 is followed, except that:
Instead of 14 weight percent cis-polybenzoxazole, the dope contains 12 weight percent of a polymer formed by the reaction of 4,6-diaminoresorcinol bis(hydrogen chloride) and 1,1,3-trimethyl-3-phenylindan-4',5-dicarboxylic acid in polyphosphoric acid, such as is described in Summers et al., Ser. No. 513,316 (filed Apr. 20, 1990), which is incorporated herein by reference;
The sheets pressed together are 2 inches by 3 inches; and
Only one sample is pressed after coagulation at 300° C. for 90 minutes under 5000 lbs pressure. It turns black and sticks to the press.

EXAMPLE 3

Composite Containing Polybenzoxazole Fiber and Polybenzoxazole Matrix.

The procedure of Example 1 is followed, except that:
The cloth consists essentially of polybenzoxazole fiber and has dimensions of about 5 inches by 5 inches;
The dope films have dimensions of about 5 inches by 5 inches;
The sample is coagulated in about 2 gallons of water.
The resulting composite appears similar to the composite of Example 1.

EXAMPLE 4

Composite Containing Two Layers of Carbon Fiber and Polybenzoxazole Matrix.

The procedure of Example 1 is followed, except that:
The cloth and dope film are laid up so that there is from top to bottom: a layer of Teflon TM film, a layer of polybenzoxazole dope, a layer of carbon fabric, a layer of polybenzoxazole dope, a layer of carbon fabric, a layer of polybenzoxazole dope, and a layer of Teflon TM film;
The prepregging is carried out at 150° C. and 5000 lbs pressure for 3 minutes;
The finished composite is pressed under 5000 lbs pressure at a temperature ramped from room temperature to 300° C. over 90 minutes and held at 300° C. for 30 minutes.

The resulting structures are much stiffer than the structures prepared in Example 1.

What is claimed is:
1. A fiber-reinforced composite comprising:
   (1) a number of fibers sufficient to provide reinforcement for the composite; and

(2) a matrix, that contains a polybenzoxazole polymer or copolymer and/or a polybenzothiazole polymer or copolymer, in a quantity sufficient to bind the fibers together and maintain the alignment of the fibers, wherein the matrix polymer or copolymer contains AB-PBZ mer units represented by the formula:

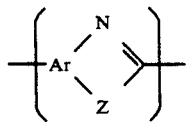

or AA/BB-PBZ mer units represented by the formula:

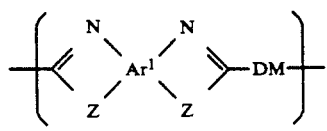

or both, and each Z is independently an oxygen or a sulfur atom; each Ar contains an aromatic group selected so that the matrix polymer forms liquid crystalline domains when dissolved in solution at suitable concentrations; and DM is a bond or an aromatic group selected so that the matrix polymer forms liquid crystalline domains when dissolved in solution at suitable concentrations.

2. The composite of claim 1 wherein the polybenzoxazole or polybenzothiazole polymer or copolymer in the matrix is not thermoplastic.

3. The composite of claim 2 wherein the composite contains at least about 20 volume percent fiber and at least about 20 volume percent matrix.

4. The composite of claim 2 wherein the matrix further contains a polymer that is not polybenzoxazole or polybenzothiazole.

5. The composite of claim 2 which is a unidirectional composite.

6. The composite of claim 2 which is a multidirectional composite.

7. The composite of claim 2 which is a random fiber composite.

8. The composite of claim 2 wherein the polybenzoxazole or polybenzothiazole polymer or copolymer consists essentially of AA/BB-PBZ mer units represented by the formula:

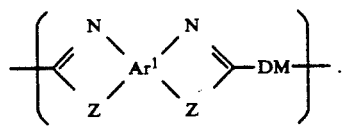

9. The composite of claim 2 wherein the polybenzoxazole or polybenzothiazole polymer or copolymer consists essentially of mer units selected from the group represented by the Formulae:

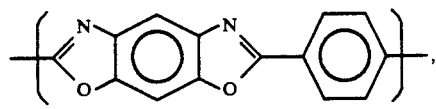

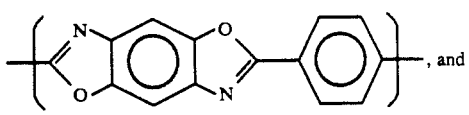

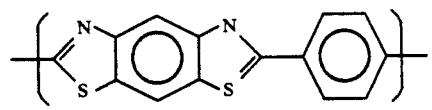

10. The composite of claim 9 wherein the matrix consists essentially of polybenzoxazole polymer.

11. The composite of claim 9 wherein the matrix consists essentially of polybenzothiazole polymer.

12. The composite of claim 9 wherein the matrix polymer has an intrinsic viscosity of at least about 10 dL/g in methanesulfonic acid at 25° C.

13. The composite of claim 2 wherein the polybenzoxazole or polybenzothiazole polymer or copolymer consists essentially of AB-PBZ mer units represented by the formula:

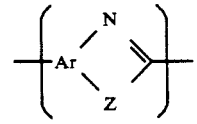

14. The composite of claim 2 wherein the polybenzoxazole or polybenzothiazole polymer or copolymer consists essentially of mer units selected from the group represented by the Formulae:

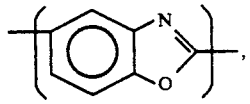

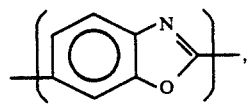

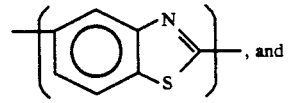

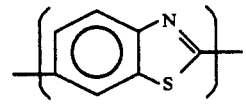

15. The composite of claim 13 wherein the matrix consists essentially of polybenzoxazole polymer.

16. The composite of claim 13 wherein the matrix consists essentially of polybenzothiazole polymer.

17. The composite of claim 9 wherein the matrix polymer has an intrinsic viscosity of at least about 5 dL/g in methanesulfonic acid at 25° C.

18. The composite of claim 2 wherein said fibers contain materials selected from the group comprising aramid, boron, glass, carbon, gelspun polyethylenes, polybenzoxazole, polybenzothiazole, or polybenzimidazole.

19. The composite of claim 2 which contains more than one layer of fiber.

* * * * *